June 12, 1934.  W. T. CHRISTMAN ET AL  1,962,635
ENAMELING APPARATUS
Original Filed March 11, 1927    5 Sheets-Sheet 2
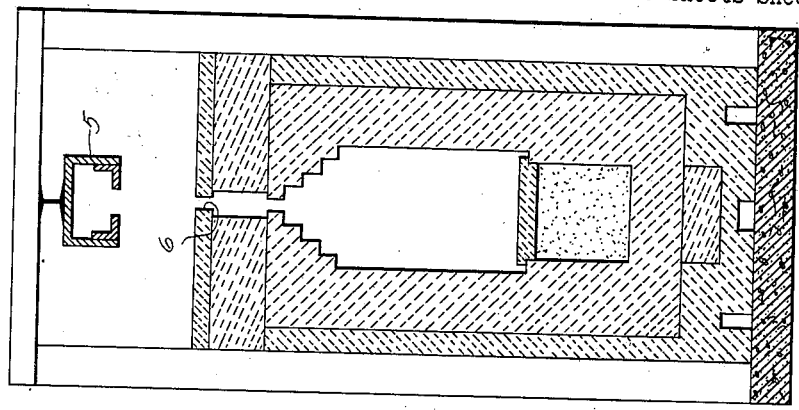
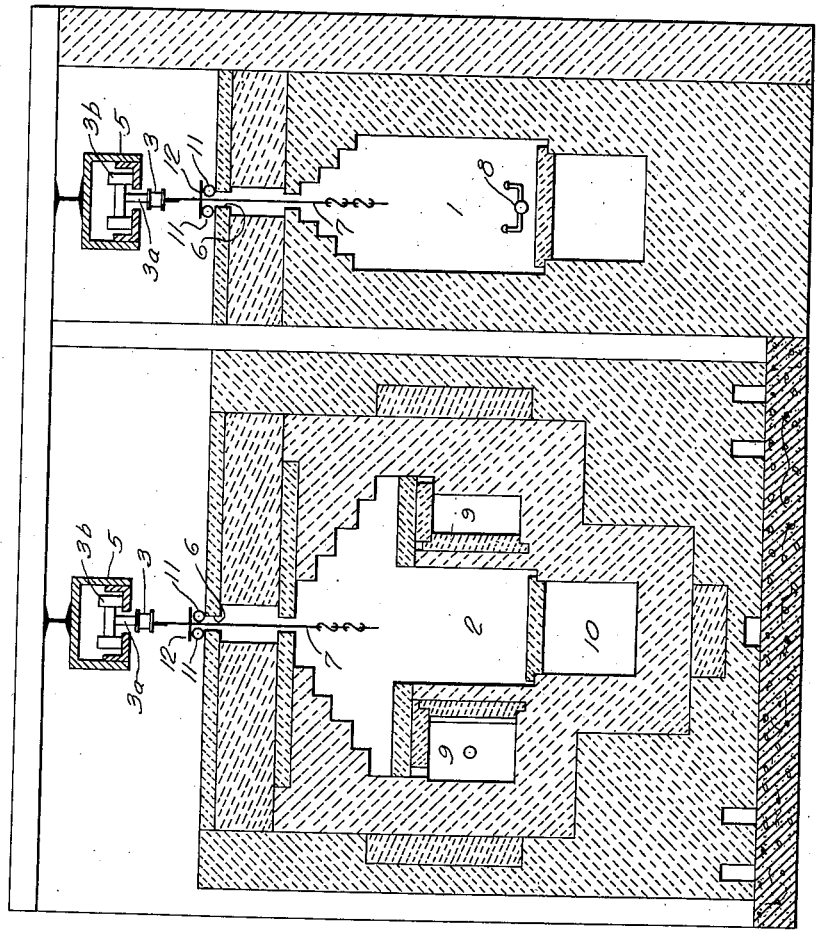
INVENTORS
William T. Christman
Herbert Dean
by their attorneys
Byrnes, Stebbins, Parmelee June 12, 1934.    W. T. CHRISTMAN ET AL    1,962,635
ENAMELING APPARATUS
Original Filed March 11, 1927    5 Sheets-Sheet 3

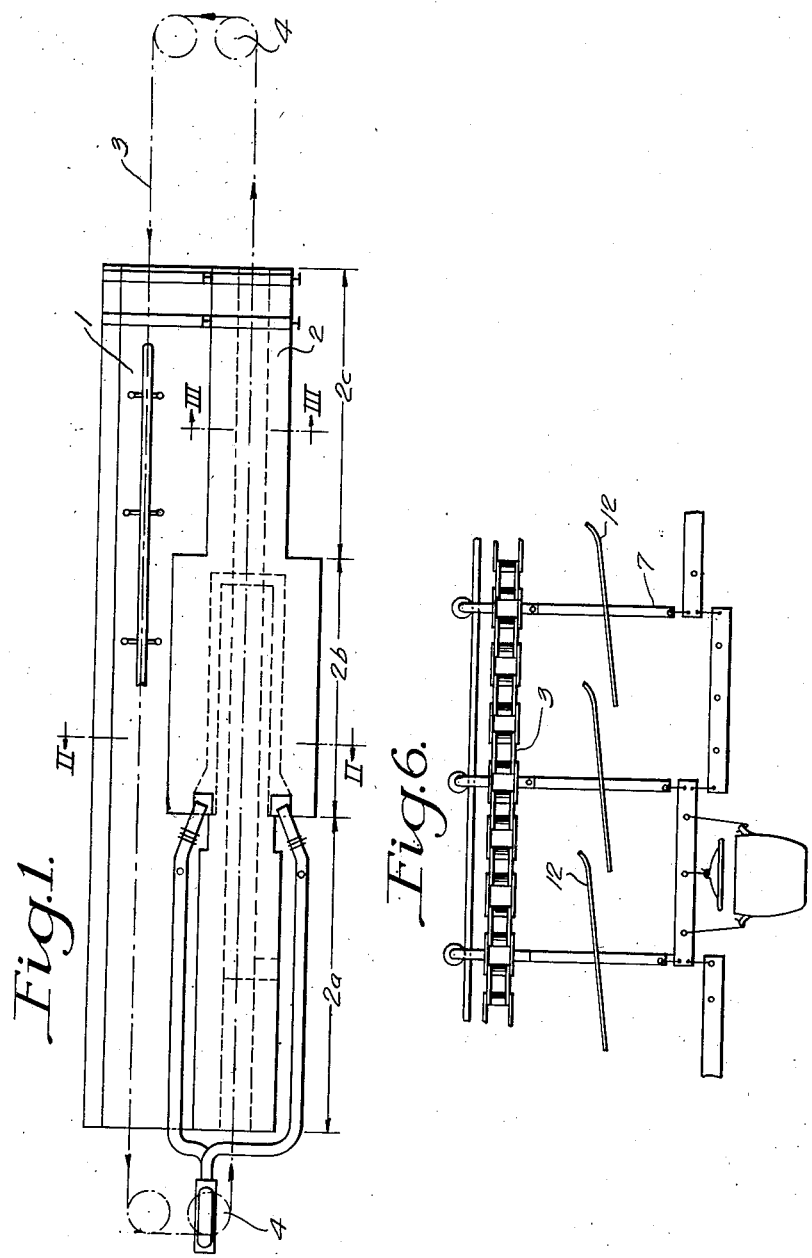

INVENTORS
William T. Christman
Herbert Dean
by their attorneys

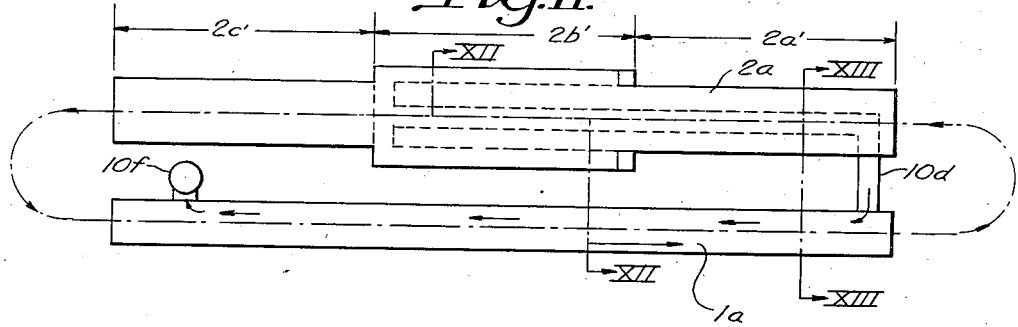
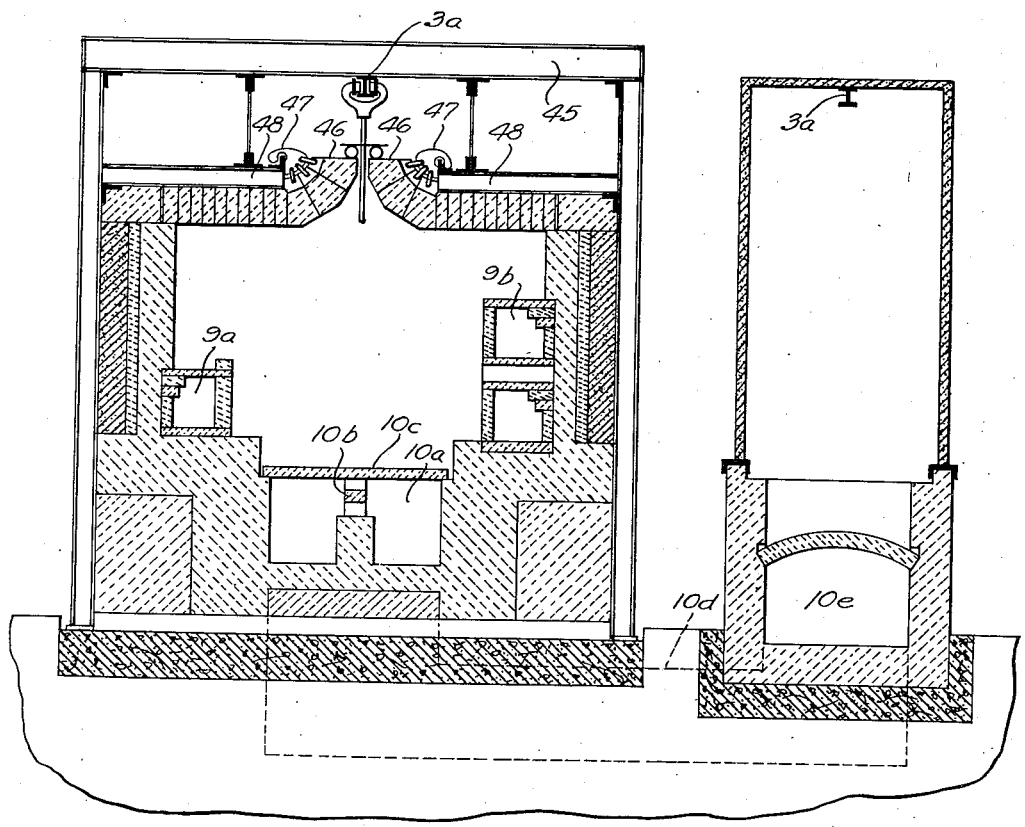

June 12, 1934.  W. T. CHRISTMAN ET AL  1,962,635
ENAMELING APPARATUS
Original Filed March 11, 1927   5 Sheets-Sheet 5

Patented June 12, 1934

1,962,635

UNITED STATES PATENT OFFICE 1,962,635

ENAMELING APPARATUS

William T. Christman and Herbert Dean, McKees Rocks, Pa., assignors to The Carborundum Company, Niagara Falls, N. Y., a corporation of Pennsylvania Continuation of application Serial No. 174,521, March 11, 1927. This application March 23, 1928, Serial No. 264,169. Renewed January 27, 1933

27 Claims. (Cl. 25—142)

This invention relates to furnace structures, and more particularly to an apparatus for the treatment of enamel ware, although it may obviously be used for other purposes. Enamel ware includes a wide range of articles, such for instance, as culinary utensils. Such articles are made of metal, usually steel, worked to shape and then coated. This application constitutes a continuation of our copending application, Serial No. 174,521, filed Mar. 11, 1927.

Coating is effected by dipping the ware in a fluid preparation of a substance, which at the proper temperature, will vitrify. After dipping, the article is gradually heated, first to dry the coating and then to effect vitrification. The temperature at which the coating vitrifies ranges around 1500° Fahrenheit and upwards.

In carrying out the invention, the articles are first dipped, then gradually advanced through a long chamber or through a succession of chambers in which the coating is first partially dried, then heated further to complete the drying, and then fired at a high temperature to produce vitrification of the enamel. Beyond the region of vitrification, the articles gradually lose their heat and finally emerge from the chamber at a temperature such as to insure their safety against injury.

Our invention contemplates the provision of a simple form of apparatus wherein the drying and firing of the enamel coating may be economically and efficiently carried out, and wherein the articles, during the greater portion of their travel may be shielded from exposure to the products of combustion. The invention further contemplates the provision of a drying and heating apparatus wherein attendants may have access to the articles between the steps of drying and firing for the purpose of performing such operations as may be necessary, as for instance, what is known as "beading".

The invention may be understood by reference to the accompanying drawings, in which—

Figure 1 is a top plan view of a heating furnace embodying our invention;

Figure 2 is a vertical transverse section on a larger scale in the plane of line II—II of Figure 1;

Figure 3 is a transverse section through a part only of the structure in the plane of line III—III of Figure 1;

Figure 6 is a view showing in side elevation, a detail portion of the structure, showing the closure plates for the slot in the top of the furnace;

Figure 11 is a diagrammatic plan view of an installation wherein hot gases of combustion are transferred from the furnace to the drier;

Figure 12 is a transverse vertical section through the installation shown in Figure 11 in substantially the plane of line XII—XII;

Figure 4:
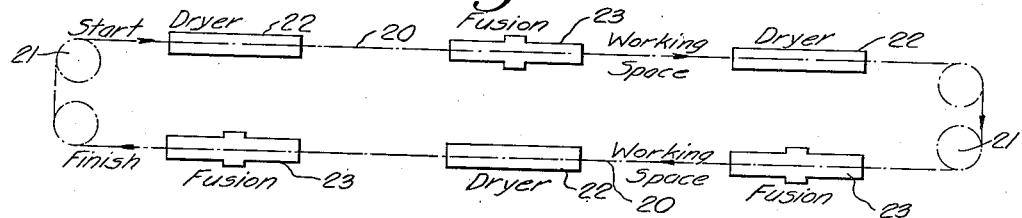
Figure 4 is a diagrammatic view showing a plurality of drying and fusing chambers arranged in succession.

In the construction shown in Figures 1 to 3 of the drawings, there are two tunnel members, 1 and 2. These members extend horizontally side by side and are parallel. Located above the furnace structure is a conveyor 3 which comprises an endless chain, or its equivalent, which passes around sheaves 4 at each end of the apparatus, and which are driven by any suitable driving mechanism, not shown. The chain 3 is suspended from hangers 3ª, and these hangers have rollers 3ᵇ thereon which engage in a runway 5 located above the top of the oven chamber. The direction of travel of the chain is indicated by arrows in Figure 1. The sheaves 4 are located in a plane above the top of the furnace structure, and at one end of the furnace they are preferably located a considerable distance from the furnace structure so that the chain will have an appreciable travel after emerging from the discharge end of the chamber 2 before re-entering the intake end of the chamber 1. At the other end of the furnace structure the chain preferably has less travel through the open, and in some cases, this portion of the chain might be entirely enclosed, as will be readily understood.

Along the center of the top of the chambers 1 and 2 is a continuous slot 6. Suspended from the chain 3 at intervals are hangers 7 from which the ware is adapted to be hung, as shown in Figure 6. Pivotally carried on each of the hangers 7 is a plate 12. These plates are rectangular and are of a heat resistant metal. Their width is such that they more than span the slot 6 in the top of the chambers 1 and 2, and they are of a length somewhat greater than the interval between successive hangers 7.

The greater length of the plates is rearwardly of the pivot, so that each plate, when free to do so, will tip slightly rearwardly from a horizontal position to the inclined position shown in Figure 6. Being somewhat longer than the interval between the hanger 7 and being identically arranged, they overlap one another, as shown in Figure 6. The forward ends of these plates, with respect to the direction of their travel, are preferably upturned. Located along each side of the slot 6 is a guide, which is preferably in the form of a pipe 11 through which water can be circulated to protect such guides or pipes from heat. The plates 12 are located on the hangers 7 at just such height that they will ride along the top of the pipes 11 with the forward end of one plate raised on the rear end of the next plate. In this way the slot along the top of the furnace is continuously closed by the overlapping plates 12. When the hangers are traveling free of the furnace structure, the plates 12 are hung free and do not interfere in any way with the free operation of the chain.

Figure 14:
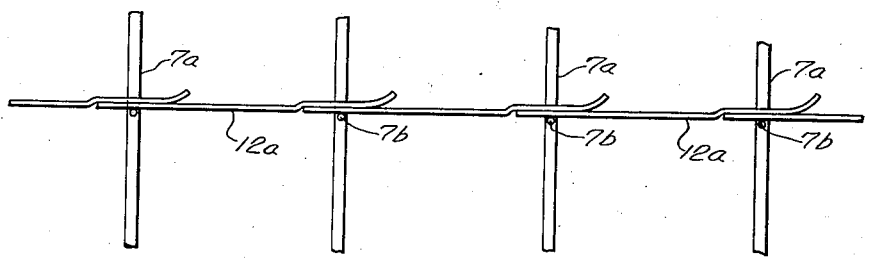
Figure 14 is a side elevation of a portion of the conveyor showing a modified arrangement for the closure plates.

In Figure 14 we have shown a modification of the arrangement of the closure plates. In this figure, 7ª designate rods depending from the conveyor (not shown), which rods are adapted to carry the ware, as illustrated in Figure 6. The closure plates are designated 12ª. A rod 7ª passes through the forward end of each plate, and the next succeeding rod passes through the other end of the same plate, so that each rod passes through the overlapping ends of two plates. The plates are free to slide up and down on the rods, but their downward movement is limited by pins 7ᵇ. The pins are of less length than the width of the slot in the top of the furnace, so that they do not interfere with the passage of the rods along the slot.

As the conveyor moves along the top of the furnace, the plates 12ª can ride along the guides and close the slot in the top of the furnace. The plates do not prevent the conveyor from passing around the sheaves because the rods 7ª are not rigidly connected to the plates, and the distance between successive rods 7ª is such that the plates 12ª do not need to be long enough to prevent the conveyor from making a sharp turn.

Figure 7:
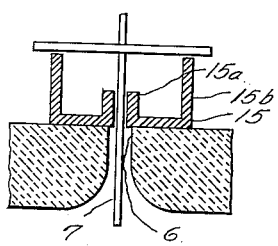
Figure 7 is a detail view showing another arrangement for the guides for the hangers passing through the top of the furnace.

Instead of using water cooled pipes along the slot 6, steel guides may be arranged along each side of the slot 6, as shown in Figure 7. These guides have inside flanges 15ª against which the hangers 7 may contact, and the flanges 15ª will prevent the hangers from coming into contact with the refractory material at each side of the slot. Each of the guides has an outer rail portion 15ᵇ on which the plates rest to close the slot. The rails 15 may, for instance, be of a 27% chromium iron or other high temperature alloy, and can be used in installations where the temperature is so high that water cooling would otherwise be necessary. This arrangement is particularly desirable where it is found that the condensation of moisture and volatile constituents from the enamel takes place on the water pipes and results in the corrosion of the latter.

Figure 8:
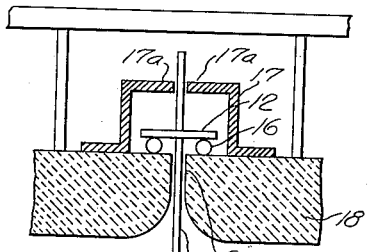
Figure 8 is another detail view of this arrangement, the top of the furnace being shown as being comprised of a suspended arch.

In some installations it may be desirable to use water pipes, and to provide a housing therefor. Such an arrangement is shown in Figure 8 wherein there is a pipe 16 along each side of the slot 6. Outside of each water pipe 16 is a guide rail or enclosing rail 17, such for instance, as a Z-bar. The Z bars 17 enclose the pipes 16 as well as the plates 12 on the hangers 7.

The inturned flanges 17ª of these Z-bars form a guide for engaging the hangers 7 to prevent the hangers from scraping against the brick work or refractory material forming the top of the furnace. In Figure 8 the top of the furnace, designated generally as 18, is a suspended arch structure. The provision of a suspended arch simplifies the construction of the furnace where a slot longitudinally of the center of the arch is required.

The tunnel 1 in the arrangement shown in Figures 1 to 3 inclusive is a preliminary drying and heating chamber. The temperature in this chamber is ordinarily so low that the water cooled pipes 11 could be omitted if desired, and in fact, for this part of the structure, the entire slotted arrangement could be omitted. The tunnel 2 includes the fusing chamber where the temperature of the article is raised to a point sufficient to effect vitrification of the coating material. The articles to be treated are hung on the chain 3 prior to the entrance of the hanger into the chamber 1 and at the right hand end of the apparatus, as viewed in Figure 1, and move in the direction indicated by arrows in the drawings.

The tunnel member 1 may be provided with heating elements, as, for instance, gas burners 8, to afford drying and heating conditions where such an arrangement is considered desirable. These heaters 8, in the particular construction shown where the overall length of the apparatus is about sixty feet, extend from a point about fifteen feet inwardly from the intake of the tunnel member 1 through substantially the entire remainder of the extent of this tunnel.

The volume of the flames, the size of the chamber, and the rate of advance are so correlated that the article is not merely thoroughly dried or baked, but is gradually and thoroughly heated to a temperature suited for its further progress.

The articles emerge from the tunnel 1, traveling from right to left, as viewed in Figure 1, and are carried around the entrance end of the tunnel member 2, the exposure to the open air in this portion of the travel of the ware preferably being short as possible. If it is desired to perform the operation known as "beading" in which some of the enamel is removed from the bead of the ware after it has been coated and dried, in order to prevent objectionable streaking or dripping, it may be readily done at this point where the ware travels through the open. Decoration of the ware may also, if desired, be done at this point, for instance, by adding other glazes to form a pattern. If desired, however, this portion of the conveyor might also be enclosed.

It has been previously pointed out that in the particular installation shown the tunnel 2 is about sixty feet long. The tunnel 2 is divided into three sections of approximately equal length, designated 2ª, 2ᵇ and 2ᶜ. The middle section 2ᵇ is the heating section, and its structure may be clearly understood by reference to Figure 2. At each side of the tunnel 2 is a combustion chamber which is formed in the side wall, these fire boxes being designated 9. The exposed walls of the combustion chambers are preferably of a material which is a high conductor of heat and which is a good radiator of heat, such, for instance, as silicon carbide.

At the bottom of the tunnel may be another combustion chamber or heating flue 10. The fire boxes 9 and 10 are co-extensive or substantially co-extensive with the central section $2^b$ of the furnace. Fuel is burned in the combustion chambers 9, and if desired, in the flue 10, and the heat is radiated through the exposed walls into the tunnel, the temperature in the tunnel being raised to a point sufficient to effect fusion or vitrification of the enamel coating material on the ware. If desired, the gases of combustion may be discharged from the combustion chambers into the furnace so as to heat the ware both by radiation and by contact, in which case they would be carried through a stack specially provided for the purpose.

No heating elements would ordinarily be provided in portions $2^a$ and $2^c$ of the tunnel, so that ware traveling through the tunnel 2 will first enter a relatively cool zone, and move gradually toward the middle of the furnace where a condition of maximum temperature will prevail. Where the bottom flue extends forwardly under the hearth of the preheating zone $2^a$, the ware is heated much more rapidly, and while this zone is relatively cool as compared with the fusing zone, it is, nevertheless, heated to a very considerable extent.

After passing the middle portion of the furnace, the heat will gradually fall off toward the discharge end of the furnace.

The operation of the furnace may be explained with reference to Figure 1. The burners or gas outlets within the tunnel member 1 provide means for heating the drying tunnel 1. At the same time the combustion chambers 9 and flue 10 are in operation and the conveyor 3 is in motion.

The attendants hang the articles which have been coated upon the hangers 7 at or near the point where the conveyor 3 advances to the tunnel member 1. The travel of the conveyor is relatively slow and the removal of ware which has been fired can easily be effected by attendants working at the same end of the furnace as the attendants who hung the ware on the conveyor. The articles advance through the tunnel member 1 and as they advance they are thoroughly dried and baked and become heated throughout. Emerging from the tunnel member 1 at the left, they follow the turn of the conveyor 3 and with such intermediate exposure to the air as may be desired. As previously explained, they then enter the chamber 2 where the ware moves from left to right, first through a region of gradually increasing temperature to a zone of maximum temperature where it remains for a sufficient time for fusion to be effected. It then travels through a region of gradually diminishing temperature until it finally emerges at the right hand end of tunnel member 2 at a temperature sufficiently low to allow exposure to the atmosphere without injury.

Figure 13:
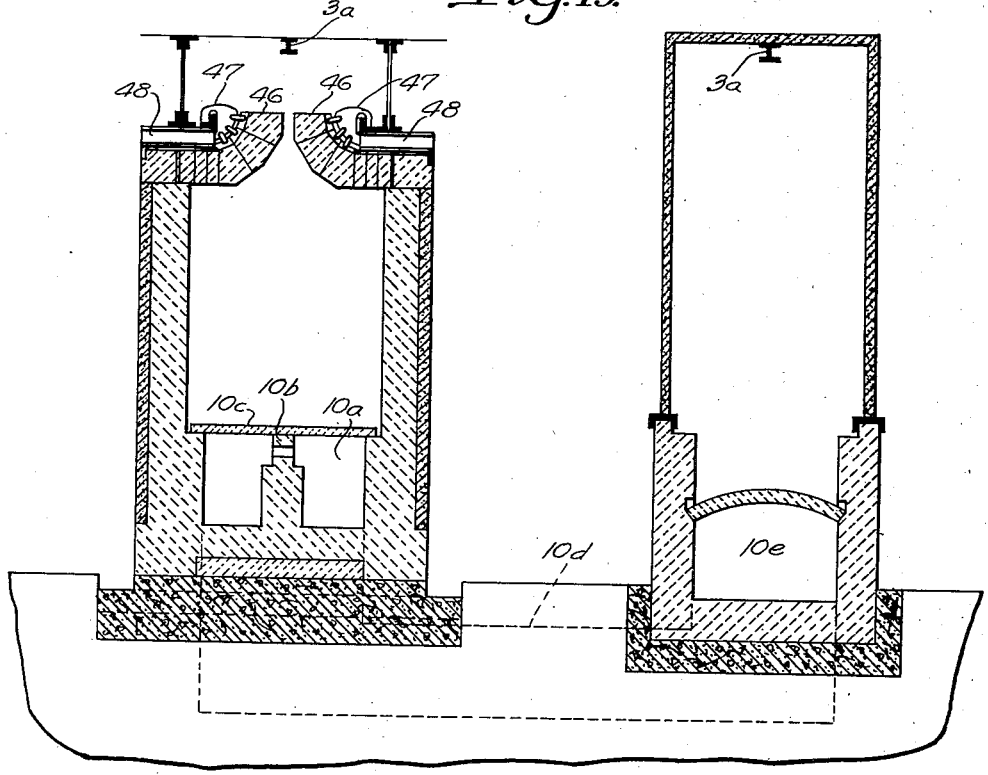
Figure 13 is a similar section in the plane of line XIII—XIII of Figure 11.

In place of gas burners for heating the drying chamber, it is, as a general rule, more satisfactory and more economical to heat the drying tunnel with hot waste gases from the furnace. Such an arrangement is illustrated in Figures 11, 12 and 13. In these figures, $2^a$ designates the furnace generally, and $1^a$ designates the drying chamber. The furnace is divided into a preheating zone $2^{a\prime}$, a hot zone $2^{b\prime}$ and a cooling zone $2^{c\prime}$, these zones corresponding to the similar zones of the structure shown in Figure 1.

At each side of the hot zone $2^{b\prime}$ are radiating combustion chambers, which may be of the single flue type $9^a$ or of the double flue type $9^b$. These combustion chambers are adapted to radiate heat directly into the furnace space within the hot zone $2^{b\prime}$, and the products of combustion therefrom are delivered to a bottom flue $10^a$. As previously pointed out in connection with the structure shown in Figure 1, fuel may also be burned in the bottom flue. The bottom flue $10^a$ is shown as having two main passages between which is open brickwork $10^b$. The floor of the furnace chamber $10^c$ is preferably of silicon carbide or other refractory material which is a good conductor of heat and a good heat radiating material. The bottom flue $10^a$ extends forwardly under the preheating zone $2^{a\prime}$. By this arrangement the preheating of the ware in the zone $2^{a\prime}$ is more rapidly effected.

At the forward end of the bottom flue $10^a$ is a transverse passage $10^d$ that communicates with a flue $10^e$ located under the drying oven $1^a$. The flue $10^e$ may extend entirely along the bottom of the oven $1^a$ for the full length thereof and communicate with a stack $10^f$ at the entrance end of the drying oven. By thus utilizing waste heat from the furnace to dry ware in the oven, the provision of burners for heating the oven can be done away with, or less fuel need be burned for heating the oven if burners are provided.

In certain types of enamel work the process is divided into more steps than has been described here, in that the ware after being burned is again coated and burned at the same or a different temperature.

In Figure 4 we have shown one modification of our invention wherein additional furnace units are arranged to provide for successive burning of the ware. In this figure 20 designates the continuous conveyor passing around sheaves 21. Disposed along one reach of the conveyor are driers 22 between which is a fusing chamber 23. Along the other reach of the conveyor are two fusing chambers 23 and a single drier 22. The arrangement is such that there is a drier alongside each fusing chamber so as to permit the utilization of waste heat from the fusing chamber in the adjacent drier. The construction of the fusing chambers is the same as the construction of the fusing chamber 2 previously described, and the construction of the drier corresponds to the construction of the driers 1 previously described.

Figure 5:
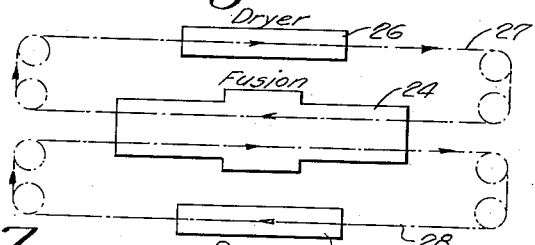
Figure 5 is another diagrammatic view showing a further modification of fusing and drying chambers.

In Figure 5 we have disclosed a further modification of our invention wherein there is a single central fusing chamber or furnace 24 with a drier 25 on one side thereof and a drier 26 on the other side thereof. There are two separate conveyors 27 and 28. The conveyor 27 travels through the fusing chamber 24 and the drier 26 and conveyor 28 travels through the fusing chamber 24 and the drier 25. In this arrangement we have shown that conveyors travel in opposite directions, as indicated by the arrows, but such an arrangement is optional and the conveyors may travel in the same direction through the furnace. Fuel economy is effected and a saving of floor space is made possible by this arrangement of a common fusing chamber and a drier at each side thereof.

From the foregoing it will be seen that in the arrangement illustrated the general plan of our invention provides a drier tunnel and fusing chamber side by side in order that the heat may be efficiently utilized. It is not essential, however, that these be exactly side by side in order to come within the spirit of our invention, but only that they shall be so placed that ware shall pass through them while carried on a single conveyor common to the two tunnels.

Figure 9:
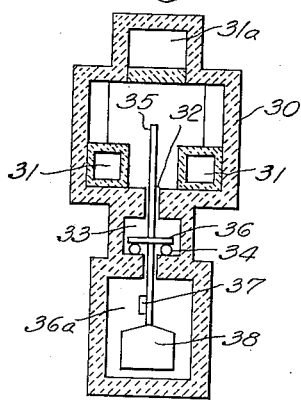
Figure 9 represents a transverse section through a furnace wherein the supports for the articles to be baked extend upwardly through the bottom of the furnace instead of projecting down through the top thereof.

As a further modification it is contemplated that instead of providing a slot in the top of the furnace, the top of the furnace may be closed and the hangers with the conveyor can be located below the bottom of the furnace chambers. One such arrangement is shown in Figure 9 wherein the furnace 30 corresponding to a fusing chamber 2, is provided with a combustion chamber 31 at each side thereof in its central portion. In the roof of the furnace is a combustion chamber 31ª corresponding to the combustion chamber 10 of the arrangement shown in Figure 2. Extending along the bottom of the furnace is a slot 32. In a space 33 below the slot are pipes 34, or other suitable guides, pipes preferably being employed so as to permit of the circulation of a cooling fluid therethrough. The hangers 35 project up through the slot 32 and have overlapping plates 36 thereon arranged similarly to the plates 12 previously described and adapted to ride over the surface of the pipes 34. The hangers 35 project down into a passage 36ª along the bottom of the furnace. The conveyor chain 37 travels along this space 36ª, and each of the hangers 35 is provided with a counterweight 38 for holding the hanger in a vertical position.

Figure 10:
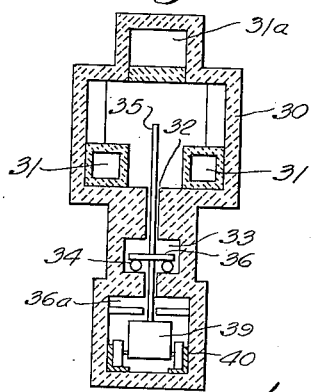
Figure 10 is a view similar to Figure 9 of a slightly modified arrangement.

In place of a counterweight 38, each hanger may be provided with a guide roller 39, as shown in Figure 10, which roller is adapted to cooperate with a guideway 40 extending along the passage 36ª, the construction shown in Figure 10 otherwise being generally similar to that shown in Figure 9.

The plates 12 and 36 not only serve to close the slot against the entrance of air into the furnace, but they also afford protection to the conveyor chain by preventing direct contact of heated gases and vapors with such chain, and serve to dissipate heat which would otherwise be conducted to the conveyor chain.

With further reference to the construction shown in Figures 12 and 13, it will be noted that the top of the furnace is in the form of a suspended arch, the arch being suspended from the framework 45. The central portion of the arch on each side of the slot, and designated 46, is hung from a member 47 that pivots on a part 48 of the metal frame. The pressure of this portion of the arch, due to its pivotal suspension, exerts a lateral pressure on the intermediate portion of the arch to more firmly position the arch against the top of the side walls of the furnace. It will also be seen from an inspection of these figures that the conveyor travels through the drying oven, being suspended from the guide 3ª located inside of the oven, but that the conveyor is located outside and over the top of the furnace. Due to the lower temperature which exists in the oven, the conveyor may pass entirely through the oven, and the slotted construction need only be provided for the furnace.

While we have shown certain preferred embodiments of our invention, it will be understood that various changes and modifications may be made therein within the contemplation of our invention and under the scope of the following claims. Furthermore, while we have specifically described the invention as being applied to the firing of enameled metal ware, it is obviously not confined to such use.

We claim:

1. In combination with a furnace chamber with slotted roof, a conveyor travelling above the roof and provided with a succession of hangers extending through the slot in the roof, successive hangers carrying pivoted to them plates of greater longitudinal extent than the interval between hangers and of greater lateral extent than the width of the slot, the portion of each plate to the rear of its pivot being heavier than the portion to the front.

2. Apparatus of the class described, comprising an endless carrier for ware, a drier, a fusing chamber, said carrier passing through the drier and the fusing chamber, and being exposed between one end of the drier and one end of the fusing chamber.

3. Apparatus of the class described, comprising an endless carrier for ware, a drier, a fusing chamber, said carrier passing through the drier and the fusing chamber, said carrier traveling in the open at each end of said chambers.

4. Apparatus of the class described, comprising a drier and a fusing chamber, and a carrier passing through a drier and the fusing chamber, the conveyor being exposed between the drier and the fusing chamber and between the fusing chamber and the drier.

5. Apparatus of the class described, comprising a succession of drier and fusing chambers alternately arranged, and an endless conveyor associated therewith and adapted to convey ware successively therethrough.

6. Apparatus of the class described, comprising a succession of drier and fusing chambers alternately arranged and spaced apart, and an endless carrier associated therewith and adapted to convey ware successively therethrough.

7. In a furnace, a furnace structure having a longitudinal slot in one wall thereof, a conveyor movable along the slot outside the furnace, supports on the conveyor projecting through the slot, said slot having heat resistant rail members along each side thereof, and a vertically self-adjustable plate on each support adapted to ride along said rail in contact therewith to close the slot.

8. In a furnace, a furnace structure having a longitudinal slot therealong, heat resisting guides along each edge of the slot, a traveling conveyor outside the furnace movable along the slot, carriers on the conveyor projecting through the slot into the furnace, and plates on the conveyor adapted to rest on said guides and ride along the same, said plates being vertically freely movable relatively to the conveyor.

9. In a furnace, a furnace structure having a longitudinal slot therealong, heat resisting guides along each edge of the slot, a traveling conveyor outside the furnace movable along the slot, carriers on the conveyor projecting through the slot into the furnace, and substantially flat overlapping plates on the conveyor adapted to rest on said guides and ride along the same, said plates being vertically self adjustable relatively to the conveyor whereby they may ride up and down with respect thereto to accommodate for irregularities in the guide.

10. In a furnace, a furnace structure having a longitudinal slot therealong, heat resisting guides along each edge of the slot, a traveling conveyor outside the furnace movable along the slot, carriers on the conveyor projecting through the slot into the furnace, and substantially flat overlapping plates on the conveyor adapted to rest on said guides and ride along the same, at least one end of each plate being freely movable vertically to adjust itself to the top of the guides.

11. In a furnace, a furnace structure having a longitudinal slot therealong, a conveyor located above the slot, rods on the conveyor projecting through the slot into the furnace, and a series of plates suspended from the conveyor, the ends of adjacent plates overlapping, at least one end of each plate being freely movable vertically, said plates being adapted to ride along the top of the furnace and cover the slot.

12. In a furnace, a furnace structure having a longitudinal slot in one wall thereof, a conveyor movable along the slot outside the furnace, supports on the conveyor projecting through the slot, said slot having a heat resistant rail along each side thereof, and a plate on each support adapted to ride along said rail to close the slot the plates being freely movable vertically with respect to the conveyor whereby they maintain themselves in contact with the rails, said plates being longer than the distance between the supports and being pivotally mounted on the supports.

13. In a furnace, a furnace structure having a slot in one wall thereof, a traveling conveyor outside the furnace movable along the slot and having conveyor elements projecting through the slot, the edges of the slot being paralleled by heat resistant water-cooled rails.

14. In a furnace, a furnace structure having a slot in one wall thereof, a traveling conveyor outside the furnace movable along the slot and having conveyor elements projecting through the slot, a water-cooled guide rail along each edge of the slot, and vertically adjustable overlapping plates on the conveyor adapted to ride on the rails and close the slot.

15. In a furnace, a furnace structure having a suspended arch at the top thereof, said arch having a longitudinally extending slot therein, and a conveyor above the furnace structure having supporting elements projecting through the slot.

16. Apparatus of the class described, including a furnace structure having a slot therealong, said furnace structure having a continuous passage therethrough, a conveyor located outside the passage in the furnace and having hangers which project through the slot into the passage, rails along each edge of the slot, and closure plates on said supports freely movable vertically thereon adapted to ride on said rails in contact therewith, said plates overlapping one another and serving to substantially close the slot in the furnace and protect the main portion of the conveyor from exposure to the direct heat in the furnace passage.

17. In an enameling apparatus, a kiln having a firing zone and a pre-heating zone, a flue leading from the firing zone along the pre-heating zone and adapted to convey gases of combustion from the firing zone, said flue constituting means for supplying heat to the pre-heating zone, the gases of combustion being partially cooled in this flue, a second flue for conducting the gases away from the pre-heating zone, a drier adjacent the kiln in which articles to be enameled are dried prior to firing, said drier being heated from the gases conducted away from the pre-heating zone.

18. Enameling apparatus comprising a horizontal endless carrier having oppositely moving parallel reaches, a drying chamber along which one reach passes, a fluxing chamber above the top of which the other reach passes, the top of the fluxing chamber being slotted longitudinally, and hangers suspended from the conveyor for supporting ware, said hangers extending through the slot in the fluxing chamber, and controllable means for heating the drier.

19. Enameling apparatus comprising a horizontal endless carrier having oppositely moving parallel reaches, a drying chamber along which one reach passes, a fluxing chamber above the top of which the other reach passes, the top of the fluxing chamber being slotted longitudinally, and hangers suspended from the conveyor for supporting ware, said hangers extending through the slot in the fluxing chamber, and controllable means for heating the drier, the conveyor traveling in the opening between both ends of the fluxing chamber and the drier, thereby providing access for placing ware on the conveyor at one end of the drier after it has been dipped, and permitting access to the ware for beading and inspection before it is fired and after it has been dried.

20. The combination with a furnace structure having a slot through the top wall thereof, of a track above the top wall of the furnace structure, carriers on said track having load supporting members depending therefrom, said members extending through the slot into the interior of the furnace, the furnace having a bearing surface thereon along each side of the slot, and vertically movable cover plates on said members adapted to ride on said bearing surfaces and seal the slot, said plates being free to move vertically with irregularities in the bearing surface and thereby maintain the slot closed.

21. The combination with a furnace structure having a slot through the top wall thereof, of a track above the top wall of the furnace structure, carriers on said track having load supporting members depending therefrom, said members extending through the slot into the interior of the furnace, the furnace having a bearing surface thereon along each side of the slot, and vertically movable cover plates on said members adapted to ride on said bearing surfaces and seal the slot, said plates having a sliding engagement with the members whereby they are free to adjust themselves vertically and accommodate for any irregularities in the bearing surfaces, and means on said members for limiting the downward movement of the plates.

22. In a furnace, a furnace structure having a longitudinal slot therealong, heat resisting guides along each edge of the slot, a traveling conveyor outside the furnace movable along the slot, carriers on the conveyors projecting through the slot into the furnace, substantially flat overlapping plates on the conveyor adapted to rest on said guides and ride along the same to seal the slot, at least one end of each plate being freely movable vertically to adjust itself to the top of the guides and means for limiting the downward movement of said plates on said carriers when not in contact with said guides.

23. In apparatus for heating enameled articles, a main furnace provided with a continuous chamber having a zone of gradually increasing temperature adapted to dry enamel and preheat the articles and a burning zone adapted to fuse the enamel, an auxiliary drying furnace parallel with said main furnace, means common to said furnaces for heating the same, and an endless conveyor chain traversing said main furnace and said auxiliary furnace and having parallel reaches spaced to provide room for work stations for applying the unvitrified enamel coating both within and without the loop of the chain.

24. In apparatus for heating enameled articles, a main furnace provided with a continuous chamber having a zone of gradually increasing temperature adapted to dry enamel and preheat the articles and a burning zone adapted to fuse the enamel, a combustion chamber for heating the burning zone, an auxiliary drying furnace parallel with the main furnace and adapted to dry enamel, a flue passage communicating with said combustion chamber and having a portion extending longitudinally through the lower part of said auxiliary furnace, and an endless conveyor chain having opposite reaches arranged to traverse said auxiliary furnace and said zones of the main furnace, the furnaces and conveyor chain being so disposed as to provide room for a work station for applying unvitrified enamel to the articles before they enter the auxiliary furnace, and a second work station for applying further unvitrified enamel to the articles between the auxiliary furnace and the main furnace.

25. In apparatus for heating enameled articles, a main furnace provided with a continuous chamber having a zone of gradually increasing temperature adapted to heat the articles and a burning zone adapted to fuse the enamel on the articles, an auxiliary furnace associated with the main furnace and adapted to dry enamel on the articles, a conveyor chain arranged to traverse said auxiliary furnace and said zones of the main furnace, and driving means for actuating said chain.

26. In apparatus for heating enameled articles, a main furnace having a tunnel chamber adapted to dry enamel, preheat the articles and fuse the enamel as the articles travel therethrough, a combustion chamber below said tunnel chamber, an auxiliary drying furnace parallel with said main furnace, a flue passage communicating with said combustion chamber and having a portion extending longitudinally through the lower part of said auxiliary furnace, and an endless conveyor chain having opposite reaches arranged to traverse said auxiliary furnace and the tunnel chamber of the main furnace and to convey the articles therethrough.

27. In apparatus for heating enameled articles, a main furnace provided with a tunnel chamber adapted to heat the articles and fuse the enamel thereon as the articles pass through the chamber, an auxiliary furnace associated with the main furnace and adapted to dry enamel on the articles, a conveyor chain arranged to traverse said auxiliary furnace and the tunnel chamber of the main furnace for conveying the articles therethrough, and driving means for actuating said chain.

WILLIAM T. CHRISTMAN.
HERBERT DEAN.